(12) United States Patent
Chanda

(10) Patent No.: US 9,742,881 B2
(45) Date of Patent: Aug. 22, 2017

(54) NETWORK VIRTUALIZATION USING JUST-IN-TIME DISTRIBUTED CAPABILITY FOR CLASSIFICATION ENCODING

(71) Applicant: Nicira, Inc., Palo Alto, CA (US)

(72) Inventor: Anupam Chanda, Los Altos, CA (US)

(73) Assignee: NICIRA, INC., Palo Alto, CA (US)

( * ) Notice: Subject to any disclaimer, the term of this patent is extended or adjusted under 35 U.S.C. 154(b) by 28 days.

(21) Appl. No.: 14/320,472

(22) Filed: Jun. 30, 2014

(65) Prior Publication Data

US 2015/0381488 A1 Dec. 31, 2015

(51) Int. Cl.
*H04L 12/28* (2006.01)
*H04L 29/06* (2006.01)
*H04L 12/931* (2013.01)
*H04L 12/715* (2013.01)
*H04L 12/851* (2013.01)
*H04L 12/721* (2013.01)

(52) U.S. Cl.
CPC .......... *H04L 69/22* (2013.01); *H04L 47/2441* (2013.01); *H04L 49/354* (2013.01); *H04L 45/64* (2013.01); *H04L 45/66* (2013.01); *H04L 47/2483* (2013.01)

(58) Field of Classification Search
None
See application file for complete search history.

(56) References Cited

U.S. PATENT DOCUMENTS

| | | |
|---|---|---|
| 5,504,921 A | 4/1996 | Dev et al. |
| 5,550,816 A | 8/1996 | Hardwick et al. |
| 5,729,685 A | 3/1998 | Chatwani et al. |
| 5,751,967 A | 5/1998 | Raab et al. |
| 6,104,699 A | 8/2000 | Holender et al. |
| 6,111,876 A | 8/2000 | Frantz |
| 6,157,955 A * | 12/2000 | Narad ............. H04L 45/16 709/228 |
| 6,219,699 B1 | 4/2001 | McCloghrie et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,046,630 B2 | 5/2006 | Abe et al. |

(Continued)

FOREIGN PATENT DOCUMENTS

WO WO 2011051750 A2 * 5/2011

OTHER PUBLICATIONS

Author Unknown , "Cisco VN-Link: Virtualization-Aware Networking," Month Unknown, 2009, 10 pages, Cisco Systems, Inc.

(Continued)

*Primary Examiner* — Bob Phunkulh
(74) *Attorney, Agent, or Firm* — Adeli LLP

(57) ABSTRACT

A method for providing a "just-in-time" distributed capability for classification encoding is described. When a source transport node processes a new flow (a flow for the first time), the source transport node in some embodiments sends a metadata packet "just-in-time" to the destination transport node to propagate the classification encoding to use for the given flow.

18 Claims, 11 Drawing Sheets

(56) References Cited

U.S. PATENT DOCUMENTS

| | | | |
|---|---|---|---|
| 7,120,728 B2 | 10/2006 | Krakirian et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,512,744 B2 | 3/2009 | Banga et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,899,048 B1 * | 3/2011 | Walker ................ H04L 12/4641 370/390 |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,018,873 B1 | 9/2011 | Kompella |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,146,148 B2 | 3/2012 | Cheriton |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,166,205 B2 | 4/2012 | Farinacci et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,386,642 B2 | 2/2013 | Elzur |
| 8,456,984 B2 | 6/2013 | Ranganathan et al. |
| 8,504,718 B2 | 8/2013 | Wang et al. |
| 8,611,351 B2 | 12/2013 | Gooch et al. |
| 8,612,627 B1 | 12/2013 | Brandwine |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,762,501 B2 | 6/2014 | Kempf et al. |
| 8,798,056 B2 | 8/2014 | Ganga |
| 8,838,743 B2 | 9/2014 | Lewites et al. |
| 9,210,090 B1 * | 12/2015 | Baldi ................ H04L 47/2441 |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0223367 A1 * | 12/2003 | Shay ................ H04L 43/106 370/231 |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0182853 A1 | 8/2005 | Lewites et al. |
| 2005/0220096 A1 | 10/2005 | Friskney et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0221961 A1 | 10/2006 | Basso et al. |
| 2006/0245438 A1 | 11/2006 | Sajassi et al. |
| 2006/0291388 A1 | 12/2006 | Amdahl et al. |
| 2007/0006293 A1 * | 1/2007 | Balakrishnan ...... H04L 63/0245 726/13 |
| 2007/0011734 A1 * | 1/2007 | Balakrishnan ........ H04L 43/026 726/13 |
| 2007/0055789 A1 | 3/2007 | Claise et al. |
| 2007/0064673 A1 | 3/2007 | Bhandaru et al. |
| 2007/0130366 A1 | 6/2007 | O'Connell et al. |
| 2007/0156919 A1 | 7/2007 | Potti et al. |
| 2007/0260721 A1 | 11/2007 | Bose et al. |
| 2007/0280243 A1 | 12/2007 | Wray et al. |
| 2007/0286137 A1 | 12/2007 | Narasimhan et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | de Her |
| 2008/0198858 A1 | 8/2008 | Townsley et al. |
| 2009/0141729 A1 | 6/2009 | Fan |
| 2009/0150527 A1 | 6/2009 | Tripathi et al. |
| 2009/0292858 A1 | 11/2009 | Lambeth et al. |
| 2010/0107162 A1 | 4/2010 | Edwards et al. |
| 2010/0125667 A1 | 5/2010 | Soundararajan |
| 2010/0131636 A1 | 5/2010 | Suri et al. |
| 2010/0214949 A1 | 8/2010 | Smith et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0029768 A1 * | 2/2011 | Nam ................ G06F 21/10 713/150 |
| 2011/0075664 A1 | 3/2011 | Lambeth et al. |
| 2011/0085557 A1 | 4/2011 | Gnanasekaram et al. |
| 2011/0085559 A1 | 4/2011 | Chung et al. |
| 2011/0085563 A1 | 4/2011 | Kotha et al. |
| 2011/0194567 A1 | 8/2011 | Shen |
| 2011/0202920 A1 | 8/2011 | Takase |
| 2011/0261825 A1 | 10/2011 | Ichino |
| 2011/0261828 A1 | 10/2011 | Smith |
| 2011/0299413 A1 | 12/2011 | Chatwani et al. |
| 2011/0299534 A1 | 12/2011 | Koganti et al. |
| 2011/0305167 A1 | 12/2011 | Koide |
| 2012/0014387 A1 | 1/2012 | Dunbar et al. |
| 2012/0044943 A1 | 2/2012 | Hinz et al. |
| 2012/0099602 A1 | 4/2012 | Nagapudi et al. |
| 2012/0182992 A1 | 7/2012 | Cowart et al. |
| 2013/0033993 A1 | 2/2013 | Cardona et al. |
| 2013/0044641 A1 | 2/2013 | Koponen et al. |
| 2013/0044752 A1 | 2/2013 | Koponen et al. |
| 2013/0054761 A1 | 2/2013 | Kempf et al. |
| 2013/0058346 A1 | 3/2013 | Sridharan et al. |
| 2013/0125127 A1 * | 5/2013 | Mital ................ G06F 9/46 718/102 |

(56) References Cited

U.S. PATENT DOCUMENTS

| | | |
|---|---|---|
| 2013/0266015 A1 | 10/2013 | Qu et al. |
| 2013/0266019 A1 | 10/2013 | Qu et al. |
| 2013/0297768 A1 | 11/2013 | Singh |
| 2013/0332982 A1 | 12/2013 | Rao et al. |
| 2014/0003434 A1 | 1/2014 | Assarpour et al. |
| 2014/0016501 A1 | 1/2014 | Kamath et al. |
| 2014/0029451 A1 | 1/2014 | Nguyen |
| 2014/0036730 A1 | 2/2014 | Nellikar et al. |
| 2014/0056151 A1 | 2/2014 | Petrus et al. |
| 2014/0086253 A1 | 3/2014 | Yong |
| 2014/0189050 A1* | 7/2014 | Rijsman ............... H04L 47/2408 709/217 |
| 2014/0201390 A1* | 7/2014 | Dalal .................... H04L 47/193 709/250 |
| 2014/0269311 A1* | 9/2014 | Srinivasan ........... H04L 47/2441 370/235 |
| 2014/0281030 A1 | 9/2014 | Cui et al. |
| 2014/0298457 A1* | 10/2014 | Lee ..................... H04L 63/1408 726/22 |
| 2014/0307554 A1* | 10/2014 | Basso ................. H04L 47/2441 370/235 |
| 2014/0307555 A1* | 10/2014 | Decusatis ............... H04L 47/24 370/236 |
| 2015/0016266 A1* | 1/2015 | Dumitrescu .......... H04L 47/623 370/236 |
| 2015/0063102 A1* | 3/2015 | Mestery ................. H04L 41/12 370/230 |
| 2015/0081863 A1* | 3/2015 | Garg ....................... H04L 41/00 709/223 |
| 2015/0103827 A1* | 4/2015 | Quinn .................... H04L 45/74 370/392 |
| 2015/0127783 A1* | 5/2015 | Lissack ............... H04L 41/5054 709/220 |
| 2015/0127789 A1* | 5/2015 | Lissack ............... H04L 41/5022 709/221 |
| 2015/0149611 A1* | 5/2015 | Lissack ................. H04L 43/045 709/224 |
| 2015/0149631 A1* | 5/2015 | Lissack ............... H04L 41/5051 709/226 |
| 2015/0180783 A1* | 6/2015 | Crasta ................. H04L 47/2483 370/235 |
| 2015/0242429 A1* | 8/2015 | Varvello ........... G06F 17/30109 707/752 |
| 2015/0281173 A1* | 10/2015 | Quinn ................. H04L 61/2507 709/245 |

OTHER PUBLICATIONS

Author Unknown, "Introduction to VMware Infrastructure: ESX Server 3.5, ESX Server 3i version 3.5, VirtualCenter 2.5," Revision Dec. 13, 2007, pp. 1-46, VMware, Inc., Palo Alto, California, USA.

Author Unknown, "Enabling Service Chaining on Cisco Nexus 1000V Series," Month Unknown, 2012, 25 pages, Cisco Systems, Inc.

Author Unknown, "iSCSI San Configuration Guide: ESX Server 3.5, ESX Server 3i version 3.5," VirtualCenter 2.5, Nov. 2007, 134 pages, Revision: Nov. 29, 2007, VMware, Inc., Palo Alto, California, USA.

Author Unknown, "Virtual Machine Mobility Planning Guide", Oct. 2007, Revision Oct. 18, 2007, , VMware, Inc., Palo Alto, California, USA.

Author Unknown, "VMware Infrastructure 3 Primer: ESX Server 3.5, ESX Server 3i version 3.5, VirtualCenter 2.5," Nov. 2007, Revision: Nov. 29, 2007, VMware, Inc., Palo Alto, California, USA.

Mahalingam, Mallik., et al., "VXLAN: A Framework for Overlaying Virtualized Layer 2 Networks over Layer 3 Networks," May 8, 2013, pp. 1-22, Network Working Group.

Pfaff, B., et al., "The Open vSwitch Database Management Protocol," Aug. 20, 2012, 34 pages, Nicira, Inc., Palo Alto, California, USA, available at http://tools.ietf.org/html/draft-pfaff-ovsdb-proto-00.

* cited by examiner

NETWORK VIRTUALIZATION USING JUST-IN-TIME DISTRIBUTED CAPABILITY FOR CLASSIFICATION ENCODING

BACKGROUND

A central problem in network virtualization is classification of logical flows at the source hypervisor, and acting on the classification at both source and destination hypervisors. Usually, an overlay network of tunnels carries the classification encodings across hypervisors. However some tunneling protocols (e.g. VXLAN) are not able to carry these encodings. This limits the functionality (features) available from a network virtualization solution on such overlays, and makes some other features impossible.

SUMMARY

A fundamental operation of the logical pipeline is classification of a logical flow and taking actions on the classification results. For efficient implementation, and for correctness under certain conditions (e.g., logical packet modification), the pipeline in some embodiments is distributed across transport nodes (e.g., hypervisors). That is, part of the pipeline runs on the source transport node, while the rest runs on the destination transport node. For some embodiments, this splitting of the pipeline requires the classification encodings (e.g., source port context, destination port context) to be carried over the wire from the source transport node to the destination transport node. Some embodiments provide a "just-in-time" distributed capability for classification encoding. When a source transport node processes a new flow (a flow for the first time), the source transport node in some embodiments sends a metadata packet "just-in-time" to the destination transport node to propagate the classification encoding to use for the given flow.

For some embodiments, a logical pipeline that delivers packets for a logical flow is a series of classification operations that determine whether and how a packet should reach the destination from the source. The logical pipeline is thus a pipeline of several processing stages, each processing stage generating a set of intermediate classification result that is used by the subsequent processing stages of the logical pipeline. In some embodiments, when the implementation of the logical pipeline is split between two transport nodes that are different computing devices in a network (e.g., different host devices each running virtualization software), the intermediate classification result produced by the processing stages at the source transport node is delivered to the processing stages at the destination transport node as context.

In some embodiments, a flow is uniquely identified with the following fields: VNI, classification encoding result, and L2-L4 headers of the logical packet. Correspondingly, the contents of the metadata in some embodiments contain the VNI, the context information of the flow (i.e., the classification encoding result), and the L2-L4 headers of the logical packet. In some embodiments, once the destination transport node receives this metadata packet, it populates an in-memory table. The in-memory table contains the context information of different flows that are in some embodiments indexed by the fields that are used to identify the flows. When the destination transport node subsequently receives data packets from the transport node, it inspects data packets to obtain the VNIs and the L2-L4 headers, and looks up in its table for the corresponding flow context. This context of the flow (i.e., the classification encoding result) is the capability that the destination transport node uses in some embodiments to infer what actions to take on the packets belonging to the flow and complete the remaining portion of the logical pipeline.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1A:
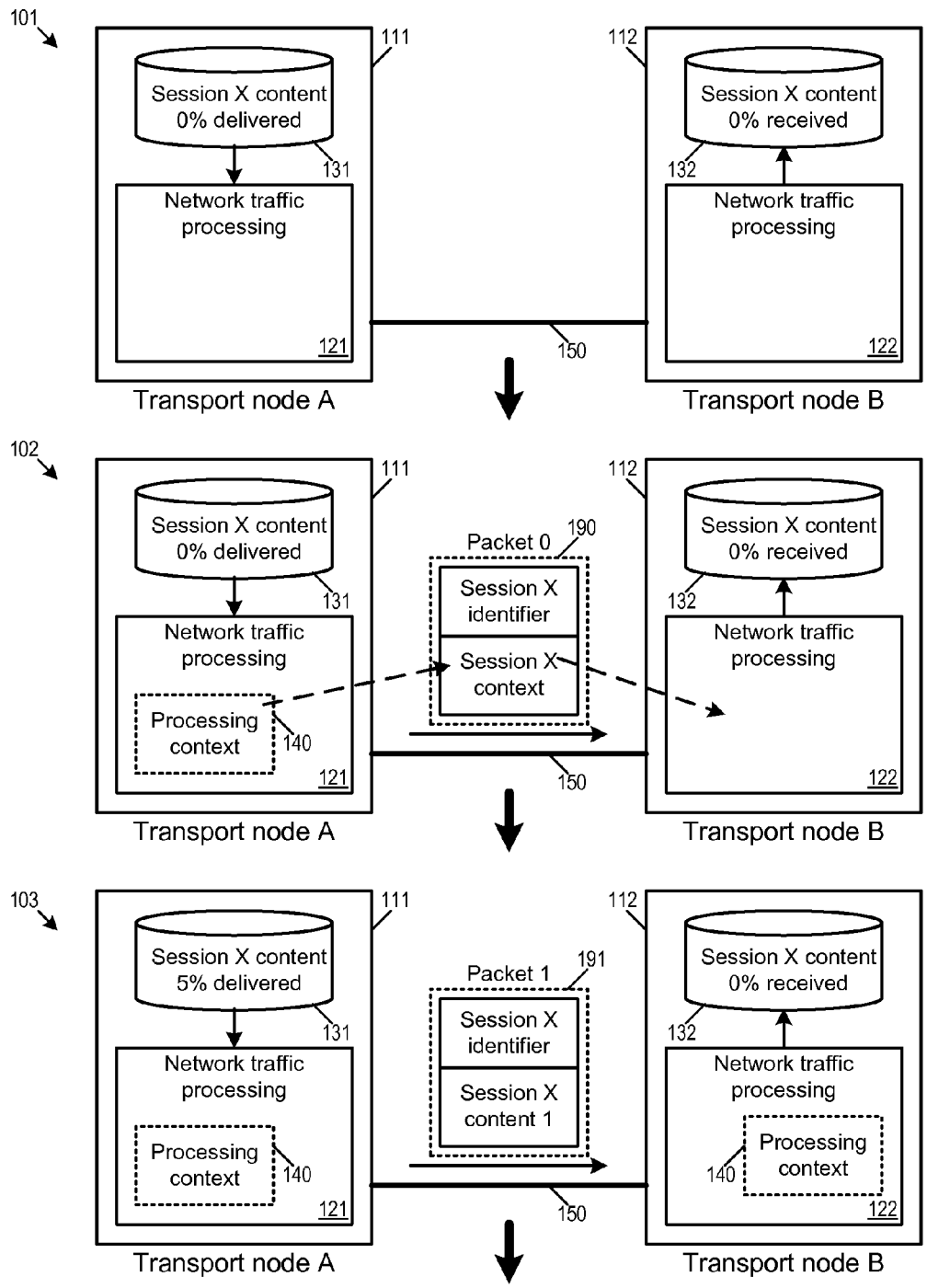
FIGS. 1a-b illustrates the sending of a metadata packet in a "just-in-time" fashion from a source transport node to a destination transport node in order to the propagate the classification encoding result for a given flow.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Network virtualization introduces logical datapath (switches or routers) entities. These entities are similar in functionality to physical switches or routers, but are decoupled from the actual physical networking fabric in a data center. Network virtualization is implemented by programming software virtual switches (vswitch) which run on hypervisors, and form an overlay mesh network with other vswitches. The features/functionalities of a logical datapath is programmed in a logical pipeline.

In some embodiments, a flow is uniquely identified with the following fields: logical datapath context (VNI), classification encoding result, and L2-L4 headers of the logical packet. Correspondingly, the contents of the metadata in some embodiments contain the logical datapath context (VNI), the classification encoding result to use, and the L2-L4 headers of the logical packet. In some embodiments, once the destination vswitch receives this metadata packet, it populates an in-memory table with this information: the VNI, L2-L4 headers of the logical packet, and the classification encodings provided in the metadata packet.

Subsequently, the source vswitch sends the logical traffic to the destination hypervisor over the VXLAN tunnel. The destination vswitch inspects the traffic to obtain the VNI and the L2-L4 headers, and looks up in its table of classification encoding information to find what classification encoding to use. This classification encoding is the capability that the destination vswitch uses in some embodiments to infer what actions to take on the flow. As a result, the destination vswitch can run the split logical pipeline because it has the complete information (capability) regarding the classification context.

In some embodiments, a fundamental operation of the logical pipeline is the classification of a logical flow and taking actions on the classification results. For efficient implementation, and for correctness under certain conditions (e.g., logical packet modification), the pipeline in some embodiments is distributed across transport nodes (e.g., hypervisors). That is, part of the pipeline runs on the source transport node, while the rest runs on the destination transport node. This splitting of the pipeline essentially requires the classification encodings (e.g., source port context, destination port context) to be carried over the wire from the source transport node to the destination transport node.

Some embodiments provide a "just-in-time" distributed capability for classification encoding. When a source transport node processes a new flow (a flow for the first time), the source transport node in some embodiments sends a metadata packet "just-in-time" to the destination transport node to propagate the classification encoding to use for the given flow.

Figure 1B:
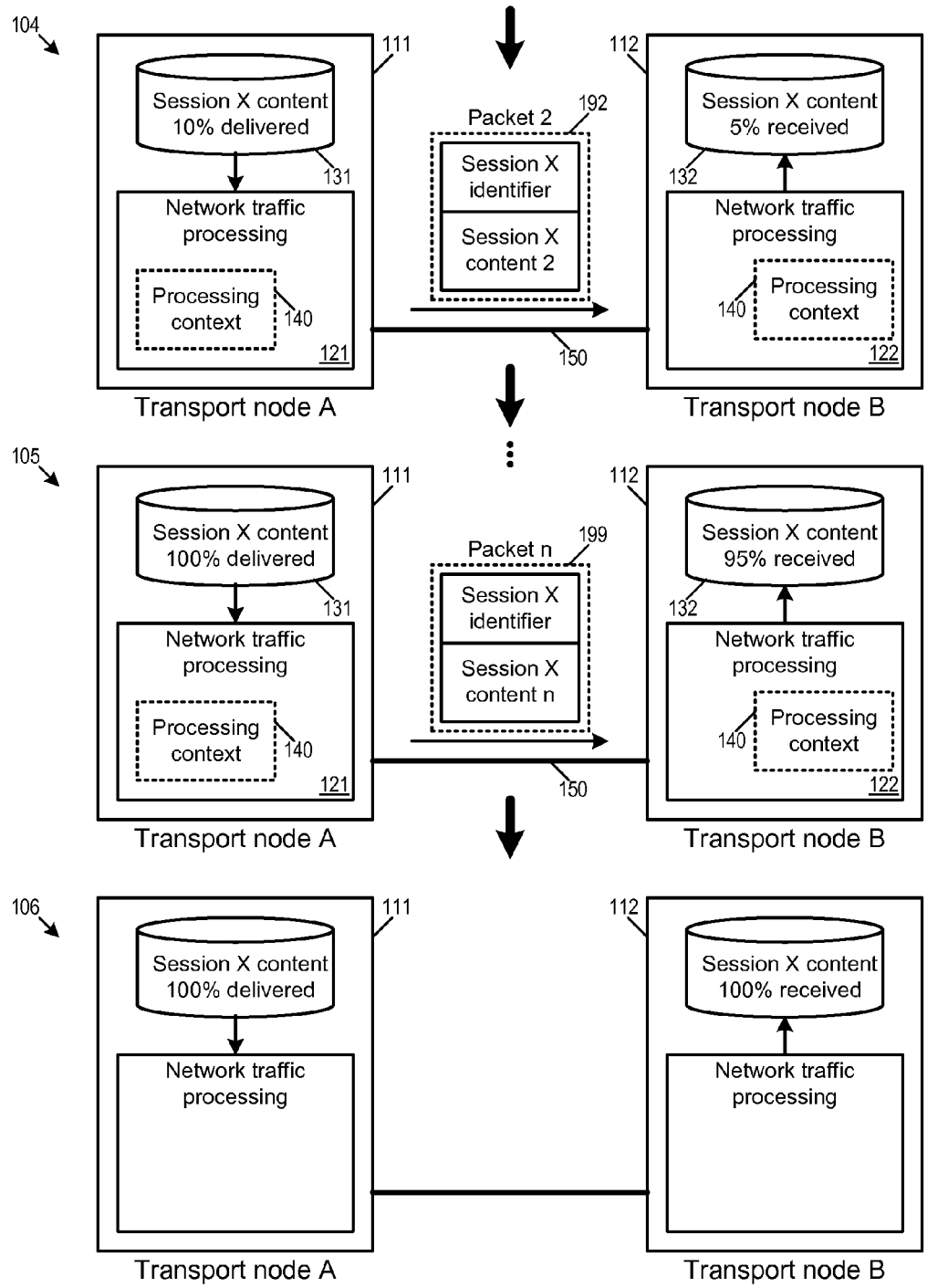

For some embodiments, FIGS. 1a-b illustrates the sending of a metadata packet 190 in a "just-in-time" fashion from a source transport node 111 to a destination transport node 112 in order to the propagate the classification encoding result for a given flow. In the example of FIG. 1, the source transport node 111 is sending packets belonging to a flow labeled as "session X" to the destination node 112.

A "flow" in some embodiments refers to a transport layer (i.e., L4) connection session under transport layer protocols such as Transmission Control Protocol (TCP) and User Datagram Protocol (UDP). A flow in some embodiments may also refer to a collection of packets being transmitted for the transport layer connection session. The flow "session X" therefore refers to a L4 connection session and/or the packets that are transmitted for the connection session. In some embodiments, a flow is uniquely identifiable by the tuple of source and destination MAC addresses (L2), source and destination IP addresses (L3), source and destination port IDs (L4), and transport protocol. Consequently, in some embodiments, a flow is defined by its source and its destination. In some embodiments in which the communication between the transport nodes is conducted as part of an encapsulated or overlay network such as VXLAN, the flow is further identified based on the VXLAN network identifier (VNI) that identifies a logical switch or an L2 segment in the overlay network. The VNI is therefore also an identifier of logical datapath.

The source transport node 111 and the destination transport node 112 are network nodes that are communicatively interlinked by a network 150, which may also interlink other transport nodes. In some embodiments, a transport node is a network node that is capable of sending and receiving packets by performing L4 level communication protocols. In some embodiments, a transport node is a computing device that that is connected to the network 150 and is running virtualization software. The virtualization software allows the computing device to serve as a host device for hosting one or more virtual machines (VMs) and to provide network and computing resources to the VMs. Virtualization software may include one or more software components and/or layers, possibly including one or more of the software components known in the field of virtual machine technology as virtual machine monitors (VMMs), hypervisors, or virtualization kernels. Because virtualization terminology has evolved over time and has not yet become fully standardized, these terms do not always provide clear distinctions between the software layers and components to which they refer. As used herein, the term, "virtualization software" is intended to generically refer to one or more software layers or components logically interposed between a virtual machine and the host platform.

The source transport node 111 and the destination transport node 112 are jointly implementing a logical pipeline for classifying the packets in the flow "session X". Each transport node handles its own portion of the logical pipeline in a network traffic processing module, which in some embodiments is implemented by the virtualization software running in the transport node. Therefore, the logical pipeline for the flow "session X" is implemented jointly by the network traffic processing module 121 of the source transport node 111 and the network traffic processing module 122 of the destination transport node 112.

The source transport node 111 is illustrated as having data content that is to be delivered to the destination transport node 112 in packets of the flow "session X". In some embodiments, a L4 connection session can be used to transport data associated with a session of web traffic, voice over IP, video streaming, remote desktop, management, e-mails, or other types of semi-permanent interactive information interchange. FIGS. 1a-b illustrate the data content as being originated in a storage 131 of the source transport node 111 and to be received by a storage 132 of the destination transport node 112. In some embodiments, the content associated with a L4 connection session is generated by an application or a user in real time and not necessarily stored in a storage device in its entirety before being transported.

The metadata 190 carries the classification encoding result for the flow "session X" from the source transport node 111 to the destination transport node 112. The metadata packet 190 is sent at the start (or before the first data packet) of the flow "session X", and the classification encoding result being carried by the metadata packet 190 is applicable to subsequent packets of the flow "session X".

In six stages 101-103, FIGS. 1a-b illustrates the delivery of the metadata packet 190 at the start of the flow "session X". The first stage 101 shows the start of the flow "session X". The source transport node 111 has yet to deliver any of the content 131 of the flow to the destination node 112 (hence 0% of the session X content has been delivered). However, the network traffic processing 121 of the source transport node 111 has started to process the flow by performing part of the logical pipeline for the flow.

At the second stage 102, the source transport node 111 has completed its portion of the logical pipeline and produced an intermediate result 140 of the classification encoding of the flow, and the source transport node 111 has yet to deliver any of the content 131 of the flow as packet to the destination node 112 (hence 0% of the session X content has been delivered).

In some embodiments, the intermediate classification result is based on the information in the headers of the flow, e.g., its source and destination MAC addresses (L2), its source and destination IP addresses (L3), its source and destination port IDs (L4), and its transport protocol. In some embodiments in which the communication between the transport nodes is conducted as part of an encapsulated or overlay network such as VXLAN, the intermediate classification is also based on VXLAN network identifier (VNI) that identifies a logical switch or an L2 segment in the overlay network. In other words, the classification by the logical pipeline is based on the set of parameters that identifies the flow in some embodiments. In some embodiments, the intermediate classification result is also known as logical context of the flow or connection session, as it provides the context for subsequent stages of the logical pipeline. The context 140 produced for the flow "session X" is delivered to the destination node 120 by the transmission of the metadata packet 190. The destination node 120 stores the context 140 to be applied to future data packets belonging to the flow "session X".

The third stage 103 shows the start of the delivery of packets containing actual content of the flow "session X" (i.e., from the storage 131). Having already sent the context of the flow, the source transport node 111 starts sending packets containing actual content of the flow "session X" to the destination node 112. As illustrated, the source transport node 111 is sending a packet 191 to the destination transport node 112. The destination transport node 112 in turn processes the content of the packet 191 by using the received context 140. The packet 191 is the first packet containing real content of the flow "session X" (so until the packet 191 arrives at the destination node 112, the destination node still has 0% of the actual transported session content.)

The fourth stage 104 and the fifth stage 105 show the delivery of subsequent packets containing actual content of the flow. The fourth stage shows the delivery of the second packet of the flow (i.e., the packet 192). The fifth stage shows the delivery of the final packet of the flow (i.e., the packet 199). The destination transport node 112 continues to apply the context 140 to all of the received packets of the flow (including the packets 192 and 199). The final stage 106 shows the completion of the flow, where 100% of the data content of session X has been delivered and received, and the destination transport node 112 is no longer using the context 140 to process packets.

The source transport node 111 generates and sends the metadata packet 190 to the destination node 112 before the start of the flow "session X". The metadata packet 190 provides the necessary context to the destination transport node 112 for processing the upcoming packets of the flow. Some embodiments therefore refer to the metadata packet 190 as a "primer" packet, since it "primes" the destination 112 for the flow "session X".

FIGS. 1a-b illustrates using a primer packet to support the splitting of a logical pipeline across different transport nodes. This is necessary for overlay encapsulation tunneling protocols such as VXLAN, because it cannot carry arbitrary tunnel metadata—it can only carry a 24-bit number identifying the logical datapath (i.e., the VNI). However, some other tunneling protocols in which metadata field is available (e.g., GRE, STT), the context (i.e., the classification encoding result) can be delivered by the metadata field of the tunneling protocol. In some of these embodiments, the source transport node need not transmit a primer packet, as the metadata field provided by the overlay tunneling protocol can be used to deliver the necessary context to support the splitting of a logical pipeline. In some embodiments, the use of the metadata field of the tunneling protocol for transmission of the context occurs only at the start of the flow (i.e., the first packet of the flow), and the delivered context is applied to the first packet as well as to all subsequent packets of the flow. This is analogous to sending the primer packet at the start of the flow as illustrated in FIGS. 1a-b.

Several more detailed embodiments of the invention are described below. Section I describes context arising from the splitting of a processing pipeline. Section II describes the generation of the primer packet for delivering the context of a flow by a source transportation node. Section III describes the storage and retrieval of the context by a destination transport node. Section IV describes an example computing device that implements some embodiments of the invention. Finally, section V describes an electronic system with which some embodiments of the invention are implemented.

I. Logical Context and Logical Pipeline

For some embodiments, a logical pipeline that delivers packets for a logical flow is a series of classification operations that determine whether and how a packet should reach the destination from the source. The logical pipeline is thus a pipeline of several processing stages, each processing stage generating a set of intermediate classification result that is used by the subsequent processing stages of the logical pipeline. In some embodiments, when the implementation of the logical pipeline is split between two transport nodes that are different computing devices in a network (e.g., different host devices each running virtualization software), the intermediate classification result produced by the processing stages at the source transport node is delivered to the processing stages at the destination transport node as context.

Figure 2:
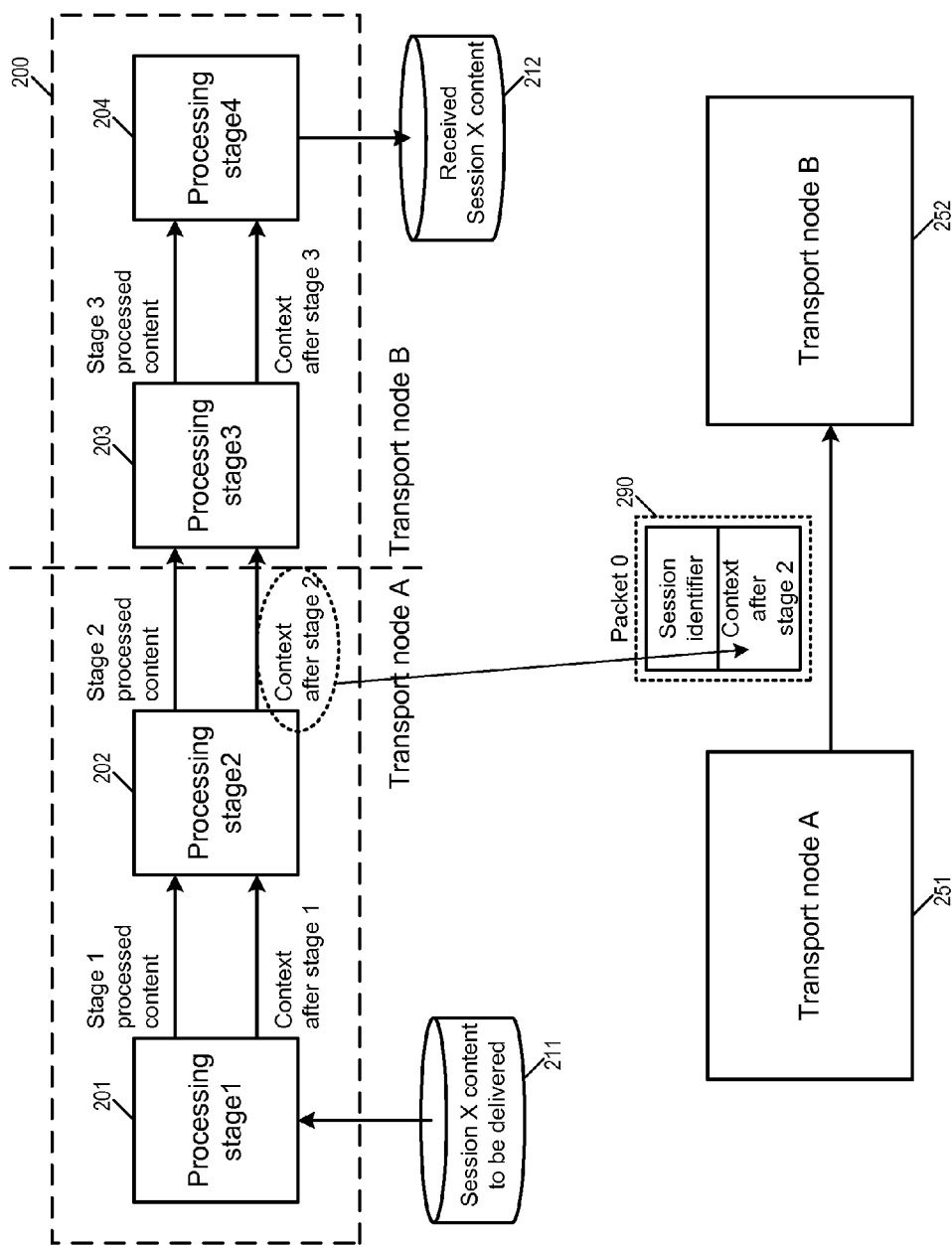
FIG. 2 conceptually illustrates a logical pipeline and the generation of intermediate classification result as context for subsequent processing stages in the logical pipeline.

FIG. 2 conceptually illustrates a logical pipeline 200 and the generation of intermediate classification result as context for subsequent processing stages in the logical pipeline. The logical pipeline is for a flow "session X" that delivers content from a source 211 to a destination 212. The logical pipeline 200 includes several processing stages 201-204. The stage 201 receives data content from the source 211, the stage 202 receives processed content from the stage 201, the stage 203 receives processed content from the stage 202, and the stage 204 receives processed content from the stage 203 and outputs the content of the flow to the destination 212. In addition to the processed content, each processing stage also produces intermediate classification result that is passed to the next processing stage.

FIG. 2 also conceptually illustrates the splitting of the logical pipeline 200 into a transport node A (251) and a transport node B (252). As illustrated, the processing stages 201 and 202 are implemented in transport node A (i.e., by the computation and network resources of the computing device of transport node A) and the processing stage 203 and 204 are implemented in transport node B (i.e., by the computation and network resources of the computing device of transport node B).

The transport node A and the transport node B are separate network entities that communicate with each other through network data packets. Since the processing stage 202 and the processing stage 203, though consecutive stages in the logical pipeline 200, are split into two different separate network entities, some embodiments therefore send the intermediate classification result produced by the processing stage 202 (or the context after the processing stage 202) to the processing stage 203 by using data packets that goes from the transport node A to the transport node B. In some embodiments, the context is delivered by a metadata packet (or primer packet) as discussed above by reference to FIG. 1a-b. In some embodiments, the context is delivered in a metadata field provided by an overlay tunneling protocol that connects the two transport nodes.

In some embodiments, a logical pipeline implements a logical switching element, and a logical context represents the state of the packet with respect to the logical switching element. A logical switching element for some embodiments is defined to operate any number of different ways that a switching element may operate, for example, to perform L2 switching by MAC address, Access Control Lists (ACL), etc. A logical context, for example, may specify the logical switching element to which the packet belongs, the logical port of the logical switching element through which the packet was received, the logical port of the logical switching element through which the packet is to be transmitted, the stage of the logical forwarding plane of the logical switching element the packet is at, etc.

In some embodiments, the logical pipeline is performed by managed switching elements (i.e., vswitches) in the managed network that are used to implement the logical switching elements. A managed switching element is a switching element that is managed by a network controller to physically perform switching operations within a computing device. The logical pipeline of some embodiments is distributed across the managed switching elements in the managed network. For example, in some embodiments, a managed switching element that initially receives the packet may perform the earlier stages of the logical pipeline while managed switching elements that subsequently receive the packet perform later stages of the pipeline.

Figure 3:
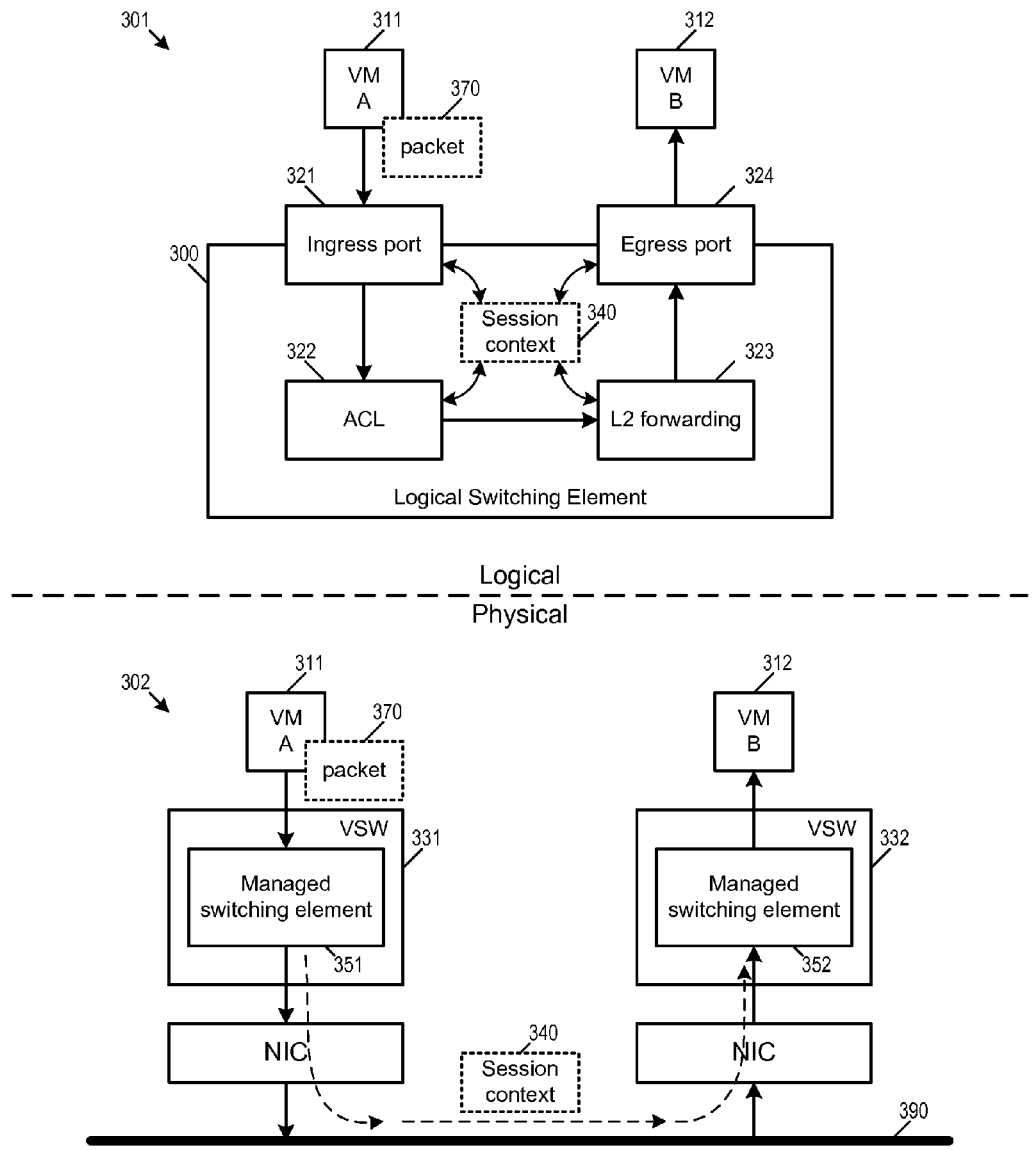
FIG. 3 conceptually illustrates a logical context of a logical pipeline that corresponds to a logical switching element.

For some embodiments, FIG. 3 conceptually illustrates a logical context 340 of a logical pipeline that corresponds to a logical switching element 300. The logical context 340 is generated for processing a packet 370 as it goes from a source (VM 311) to a destination (VM 312). FIG. 3 illustrates the logical pipeline in a logical domain representation 301 and a physical domain representation 302.

In the logical representation 301 of the logical pipeline, the logical pipeline is the logical switch 300 that forwards data packets belonging to a particular flow from a source VM 311 to a destination VM 312. The logical switching 300 includes several processing stages for classifying packets from the VM 311: a logical ingress port (or source port) stage 321, an ACL stage 322, a L2 forwarding stage 323, and an egress port (or destination port) stage 324. Each of these stages decides whether or not how the packet 370 should reach the VM 312 based on whether the packet matches a set of criteria (e.g., if the packet belongs to a particular flow or L4 connection session). As the packet 370 go through the stages of the logical switch 300, each of the stages 321-324 of the logical switch updates the logical context 340 for the processing the packet 370 based on the flow (e.g., the L4 connection session) that the packet 370 belongs to, and the updated logical context 340 is used by subsequent stages to continue the processing of the packet 370.

In the physical representation 302, the logical pipeline is split between a host machine 331 and a host machine 332, which host the VM 311 and the VM 312, respectively. For the flow that the packet 370 belongs to, the host machine 331 is the source transport node while the host machine 332 is the destination transport node. The virtualization software of the host machine 331 is operating a managed switching element 351, and the virtualization software of the host machine 332 is operating a managed switching element 352. The managed switching elements 351 and 352 implement the logical switching element 300, and the implementation of the logical pipeline is split between the managed switching elements 351 and 352. Since the managed switching elements 351 and 352 are implemented by virtualization software in two separate computing devices interconnected by a network 390, the logical context 340 for processing the packet 370 is passed from the managed switching elements 351 to the managed switching elements 352 in a packet across the network 390.

In some embodiments, when processing a packet, each processing stage of the logical pipeline determines if the packet matches a set of criteria and then performs an action (or refrains from the action) based on whether the packet matches the set of criteria. In some embodiments, each processing stage performs its matching operation by examining various fields of the L2-L4 headers of the packet, i.e., the packet's source MAC address, destination MAC address, source IP address, destination IP address, source port ID, destination port ID, and transport protocol. In other words, all of the matching decision of a packet is based on parameters that are also used to uniquely identify a flow. Consequently, the context that is generated for the packet (e.g., the context 340 for the packet 370) is applicable to all other packets belonging to the same flow. In some embodiments, the managed switching element 351 only sends the logical context of a flow before (or along with) the first packet of the flow, because the logical context of a flow is applicable to all subsequent packets belonging to the flow.

Figure 4:
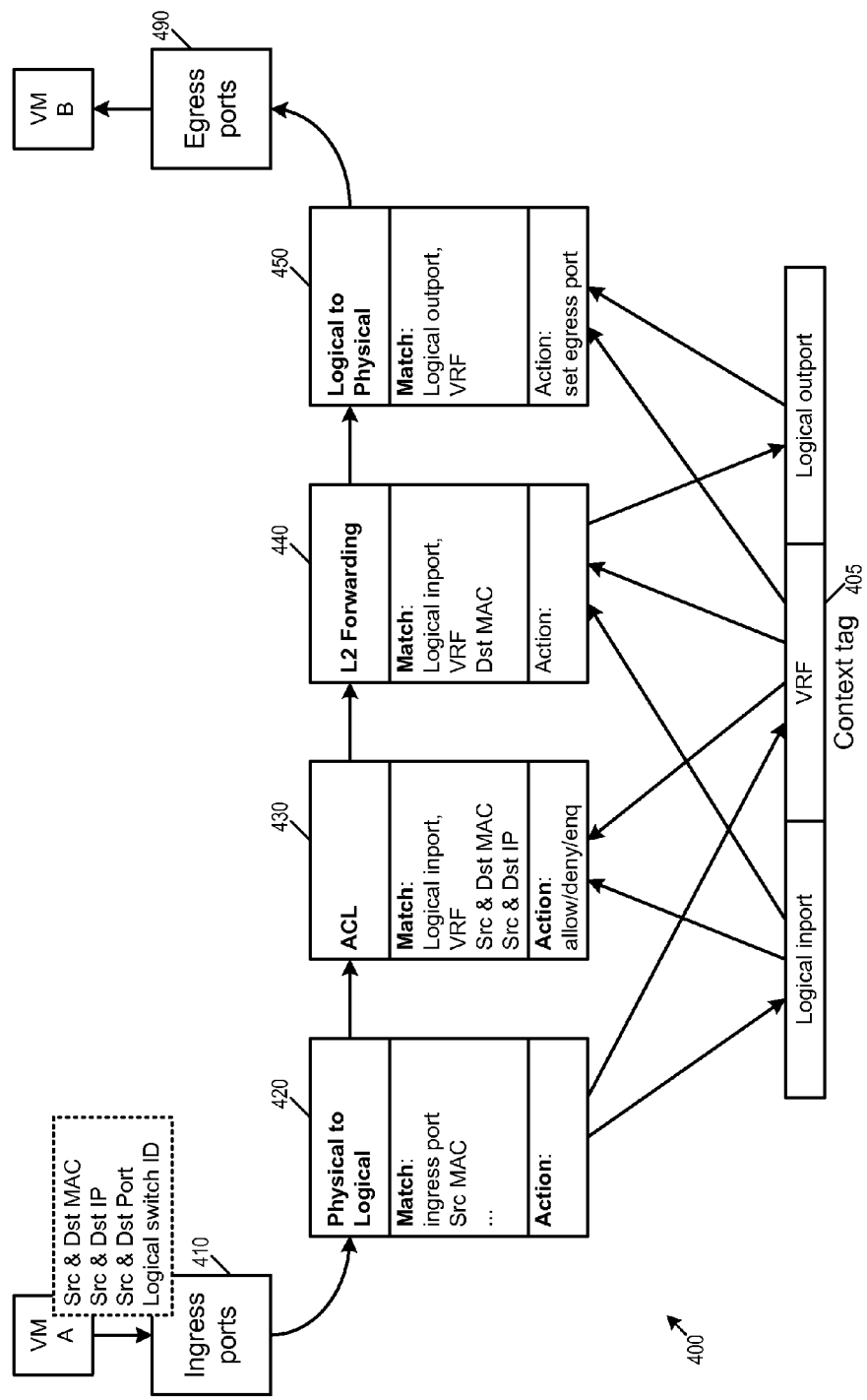
FIG. 4 conceptually illustrates an example logical pipeline in which each processing stage matches identifiers of a flow in order to determine whether to perform an action.

FIG. 4 conceptually illustrates an example logical pipeline 400 in which each processing stage matches identifiers of a flow in order to determine whether to perform an action. Each processing stage also maintains and updates context for subsequent stages. Since each processing stage determines its action based on the identifiers of the flow, the context that it is maintaining and updating is also specific to that flow and applicable to all packets of that flow.

The logical pipeline 400 includes four stages 420-450 for processing a packet, by operating on a logical context 405 of the packet, through a logical switching element that is implemented across a set of managed switching elements in a managed network. In some embodiments, each managed switching element in the managed network that receives the packet performs the processing pipeline 400 when the managed switching element receives the packet. A packet in some embodiments includes a header and a payload. In some embodiments, the header includes a set of fields that contains information used for routing the packet through a network. Switching elements may determine switching decisions based on the fields contained in the header and may, in some cases, modify some or all of the header fields.

In this example, the context 405 is a 64-bit tag that includes a 32-bit virtual routing function (VRF) field, a 16-bit logical inport field, and a 16-bit logical outport field. The 32-bit VRF field represents the logical switching element to which the packet belongs and the stage of the logical forwarding plane of the logical switching element the packet is at, the 16-bit logical inport field represents the logical port of the logical switching element through which the packet was received, and the 16-bit logical outport field represents the logical port of the logical switching element through which the packet is to be transmitted.

FIG. 4 also illustrates a set of ingress ports 410 and a set of egress ports 490. The set of ingress ports 410 conceptually represent a set of ports of the managed switching element that is performing the logical pipeline 400, ports such as tunnel ports, NICs, virtual network interfaces (VIFs), or physical interfaces (PIFs). The ingress ports 410 are ports through which the managed switching element receives packets. The set of egress ports 490 conceptually represent a set of ports (e.g., a tunnel port, NICs, VIFs, PIFs) of the managed switching element that is performing the processing pipeline 400. The egress ports 490 are ports through which the managed switching element sends packets. In some embodiments, at least one port in the set of ingress ports 410 is also a port in the set of egress ports 490. In some embodiments, the set of ingress ports 410 and the set of egress ports 490 are the same set of ports. That is, the managed switching element includes a set of ports that are used both to receive packets and to send packets.

At the first stage 420 of the logical pipeline 400, a physical to logical mapping is performed on a packet to determine the logical context of the packet. In this example, the physical to logical mapping of the first stage 420 determines the logical switching element to which the packet belongs, the stage of the logical forwarding plane of the logical switching element the packet is at, and the logical port of the logical switching element through which the packet was received. In some embodiments, the first stage 420 is performed when the logical switching element receives the packet (e.g., the packet is initially received by a managed switching element in the network that implements the logical switching elements).

Different embodiments determine the logical context of a packet based on different fields of the packet's header. For instance, as shown in FIG. 4, some embodiments determine the logical context of a packet based on the source MAC address of the packet (i.e., the machine from which the packet was sent), an inport (i.e., an ingress port in the set of ingress ports 410) of the packet (i.e., the physical port of the managed switching element through which the packet was received), a logical switch ID (e.g., VNI), the 64-bit context tag, or any combination of the four fields.

After the first stage 420 is performed, some embodiments store the information that represents the logical context in packet's the 64-bit logical context tag 405, as illustrated by arrows from the stage 420 to the corresponding fields below. For example, the logical switching element to which the packet belongs and the stage of the logical forwarding plane of the logical switching element the packet is at is stored in the 32-bit VRF field, and the logical port of the logical switching element through which the packet was received is stored in the 16-bit logical inport field.

In some embodiments, the second stage 430 is defined for the logical switching element. In this example, the second stage 430 operates on the packet's 64-bit logical context tag to determine access control of the packet with respect to the logical switching element. As shown by arrows pointing from the fields below to the stage 430, an ACL operates on the 16-bit logical inport field and the 32-bit VRF field of the packet's 64-bit logical context tag, which results in allowing the packet to be further processed (e.g., by the third stage 440), denying the packet (i.e., dropping the packet), or enqueuing the packet. In some embodiments, enqueuing the packet involves sending the packet to a queue in a set of queues that is associated with a port in the set of egress ports 490 for QoS purposes. In addition, the ACL may be defined to implement other ACL functionalities (not shown), such as counters, port security (e.g., allow packets received through a port that originated only from a particular machine(s)), and machine isolation (e.g., allow broadcast/multicast packets received from a particular machine to be sent to only machines that belong to the same tenant or logical switching element), among ACL functionalities.

In the third stage 440 of the logical pipeline 400, the packet is processed against a logical L2 (layer 2) table to determine a logical outport, which corresponds to a logical port of the logical switching element through which the packet is to be sent. As shown by arrows pointing from the fields below to the stage 440, the L2 table operates on the 16-bit logical inport field and the 32-bit VRF field of the packet's 64-bit logical context tag in addition to the destination MAC address of the packet. After the third stage 440 is performed, some embodiments store the information that represents the determined logical outport in the 16-bit logical outport field of the packet's 64-bit logical context tag, as illustrated by an arrow from the stage 440 to the outport field below.

At the fourth stage 450 of the logical pipeline 400, a logical to physical mapping is performed to identify one or more physical ports of one or more managed switching elements in the managed network that corresponds to the logical outport, which was determined in the third stage 440, of the logical switching element. For this example, the fourth stage 450 operates on the packet's 64-bit logical context tag 405 to identify one or more physical ports in the set of egress ports 490 through which to send the packet out in order for the packet to reach the determined logical outport. As shown by arrows pointing from the fields below to the stage 450, the fourth stage 450 operates on the 16-bit logical outport field and the 32-bit VRF field of the packet's 64-bit logical context tag 405, which results in setting the 64-bit logical context tag (e.g., saving the stage of the logical switching element that the packet is at, removing the 64-bit logical context tag), and setting the one or more physical ports in the set of egress ports 490 through which to send the packet out.

As mentioned above, in some embodiments, the processing pipeline 400 is performed by each managed switching element in the managed network that is used to implement the logical switching element. The processing pipeline 400 of some embodiments may be distributed across the managed switching elements in the managed network. For example, in some embodiments, the second and third stages 430 and 440 are distributed across the managed switching elements in the managed network. In some of these embodiments, the managed switching element that initially receives the packet performs the first stage 420 and the fourth stage 450 and the remaining managed switching elements that subsequently receive the packet only perform the second and third stages 430 and 440. In some embodiments, a source switching element that initially receives that packet performs both the physical to logical mapping stage (the first stage 420) and the logical to physical stage (the fourth stage 450) in order to determine which destination switching element to send the packet.

Further descriptions of logical switching element, managed switching element, context, and packet processing logical pipelines can be found in U.S. Pat. No. 8,750,164, titled "Hierarchical Managed Switch Architecture" and issued on Jun. 10, 2014. U.S. Pat. No. 8,750,164 is hereby incorporated by reference.

II. Generation of Flow Primer Packet

Figure 5:
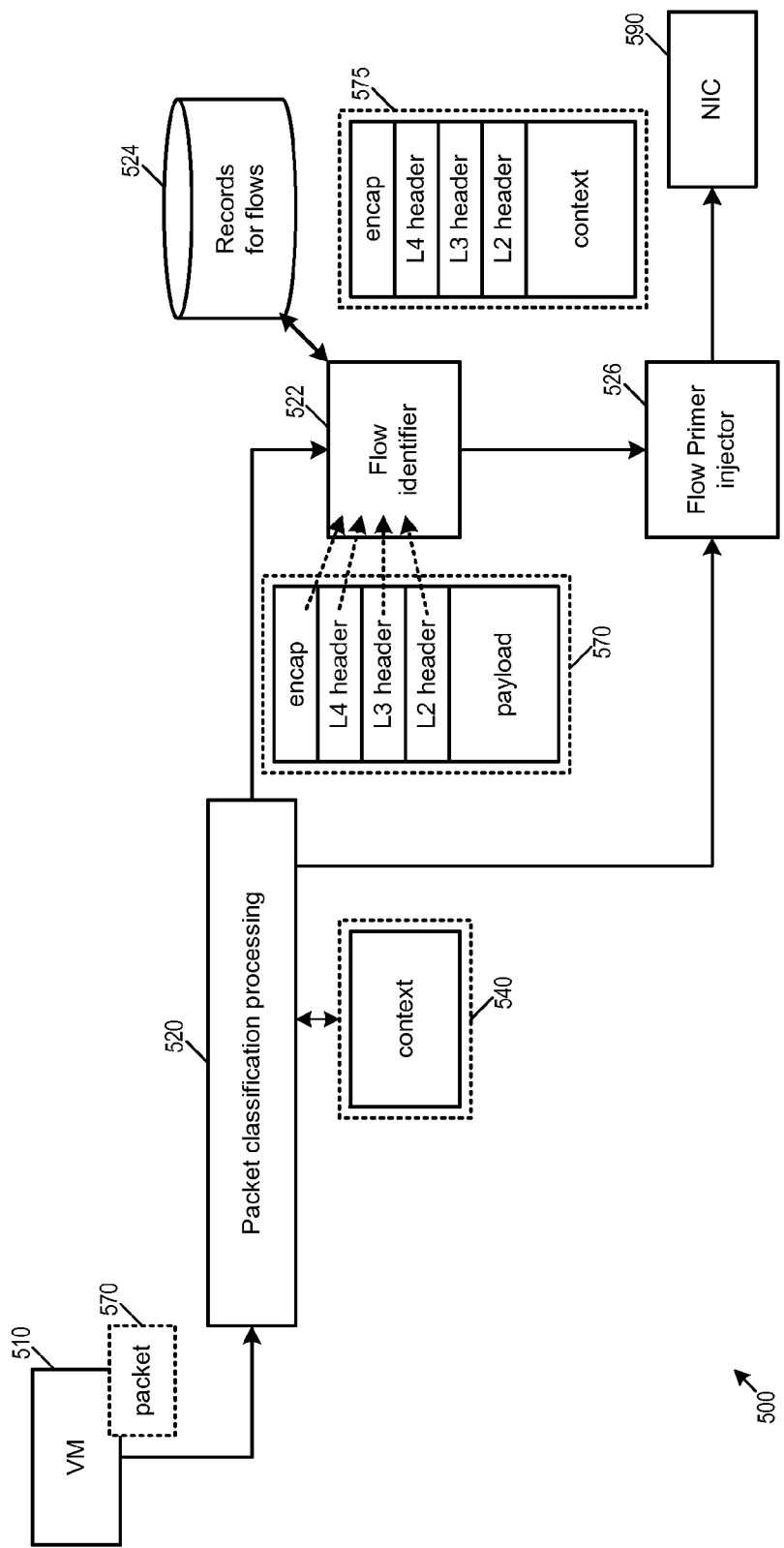
FIG. 5 illustrates a block diagram of a source transport node for generating a "just-in-time" metadata packet.

As mentioned, the source transport node in some embodiments sends a metadata packet "just-in-time" to the destination transport node to propagate the classification encoding to use for the given flow. FIG. 5 illustrates a block diagram of a source transport node 500 for generating a "just-in-time" metadata packet. The source transport node 500 receives data packet 570 from a source 510, processes the packet 570, and sends the packet 570 through a network interface controller (NIC) 590 to a network. As illustrated, the source transport node 500 includes a packet classification processing module 520, a flow identifier 522, and a flow primer 526. In some embodiments, the source transport node 500 is a computing device that is running virtualization software for hosting one or more VMs such that the source 510 is a VM, and the packet classification processing module 520, the flow identifier 522, and the flow primer injector 526 are all software modules or operations performed by the virtualization software.

The packet 570 carries payload and headers. The headers include parameters for several layers of networking protocols, including L2 (source and destination MAC addresses), L3 (source and destination IP addresses), and L4 (source and destination port ID). In some embodiments, the packet 570 is a packet encapsulated according to a specific overlay network standard such as VXLAN, STT, or GRE. In some of these embodiments, the packet 570 also carries a VNI for identifying a logical switch for the packet 570 in an encapsulation header.

To send the packet 570 from the source 510 to its destination, the source transport node 500 uses the packet classification processing module 520 to perform several classification encoding operations. These classification encoding operations are for a logical pipeline as described above in Section I. The classification encoding operations maintains and uses a context 540. The context is generated and modified based on the information in the L2-L4 (and encapsulation) headers in some embodiments.

The source transport node 500 uses the flow identifier module 522 to determine if the context 540 of the packet 570 belongs to a new flow (e.g., L4 connection session) such that a metadata packet carrying the context 540 has to be sent to the destination transport node in order to "prime" the flow. The flow identifier 522 checks the parameters in the headers (L2-L4 and encapsulation) in order to identify the flow for the packet 570. In some embodiments, the source transport node 500 keeps a record 524 of all the flows that are active so the flow identifier 522 would be able to determine if the flow identified for the packet 570 is a new flow (e.g., not in the record 524). If the identified flow is not new, the flow primer injector 526 would not inject a primer packet but instead let the packet 570 be transmitted by the NIC 590. If the identified flow is indeed new, the flow primer injector 526 creates a primer packet 575. The primer packet 575 is then injected to the network through the NIC before the packet 570. In some embodiments, the primer packet 575 is tunneled to the destination endpoint before any other packets of the flow. In some embodiments, the primer packet 575 is delivered via an out-of-band channel between the tunnel endpoints before the first packet of the flow (i.e., the packet 570) is tunneled.

As illustrated, the primer packet 575 includes the headers of the packet 570 and the context 540. The header of the packet 570 includes identifiers for the new flow such that, when included as part of the primer packet 575, the header is used to identify the primer packet 575 (and the included context 540) as the primer for the new flow. Furthermore, since a primer packet is transmitted before any packets of its flow, the recipient in some embodiments would recognize the first received packet of a flow as the primer packet of the flow.

Figure 6:
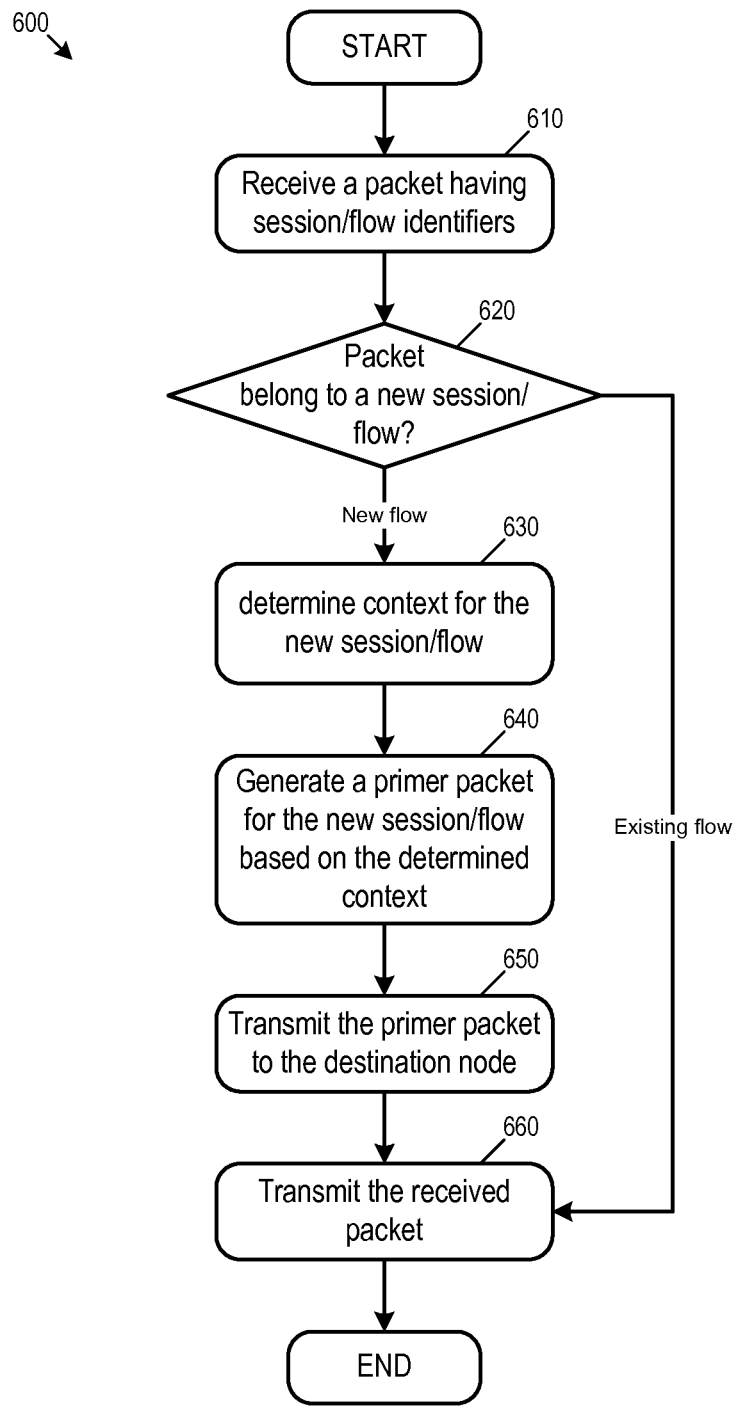
FIG. 6 conceptually illustrates a process for creating and injecting a metadata packet for priming a flow.

For some embodiments, FIG. 6 conceptually illustrates a process 600 for creating and injecting a metadata packet for priming a flow. The process 600 is performed by a source transport node such as the transport node 500. In some embodiments, the source transport node is a host machine of VMs and its virtualization software performs the process 600. The process 600 will be described by reference to FIG. 5.

The process starts when it receives (at 610) a packet having session or flow identifiers. In some embodiments in which the process is performed by virtualization software running on a host machine, the process receives the packet from one of the VMs being hosted by the host machine. In some embodiments, the packet includes L2-L4 headers that include parameters that are used as identifiers for flows or L4 connection sessions (e.g., source/destination MAC, source/destination IP, source/destination port, transport protocol.). In some embodiments, the logical switch identifier of the packet (such as VNI) is also used for identifying a flow. In some embodiments, each VM is associated with a logical switch and thereby a VNI.

The process then determines (at 620) whether the received packet is at the start of a new flow or transport/connection session. In some embodiments, the process examines a record (e.g., 524) of flows to see if the flow identifiers of the packet belong to a new flow (i.e., whether the identified flow is in the record.) If the flow identifiers indicate that the packet is that of a new flow, the process proceeds to 630. If the flow identifiers indicate that the packet belongs to an existing flow, the process proceeds to 660 to transmit the received packet without sending a flow primer packet. The process 600 then ends.

At 630, the process determines the context for the new session/flow (i.e., result of the classification encoding). In some embodiments, the process retrieves the context information from a logical pipeline that classifies the packet based on the packet's flow identifiers. The source transport node is performing at least a portion of the logical pipeline and producing an intermediate classification result as context. In some embodiments, the logical pipeline is for implementing a logical switching element, which spans multiple managed switching elements in different host machines. The virtualization software of the host machine is operating one of such managed switching elements for performing part of the logical pipeline.

The process then generates (at 640) a metadata packet (or flow primer packet) for delivering the context of the newly identified flow. The process then transmits (at 650) the generated metadata packet to destination transport node. The process then proceeds to 660 to transmit the received packet, which is the first actual packet of the newly identified flow after the metadata packet. The process 600 then ends.

III. Receiving and Applying Flow Context

As mentioned, in some embodiments, a flow is uniquely identified by the following fields: VNI, classification encoding result, and L2-L4 headers of the logical packet. Correspondingly, the contents of the metadata in some embodiments contain the VNI, the context information of the flow (i.e., the classification encoding result), and the L2-L4 headers of the logical packet. In some embodiments, once the destination transport node receives this metadata packet, it populates an in-memory table. The in-memory table contains the context information of different flows that are in some embodiments indexed by the fields that are used to identify the flows (e.g., by hashing those fields and produce a hash value as index). When the destination transport node subsequently receives a data packet, it inspects the data packet to obtain its VNIs and its L2-L4 headers. The destination transport node then uses the VNI and the L2-L4 headers to lookup its in-memory table for the corresponding flow context. This context of the flow (i.e., the classification encoding result) is the capability that the destination transport node uses in some embodiments to infer what actions to take on the packets for completing the remaining portion of the logical pipeline.

Figure 7:
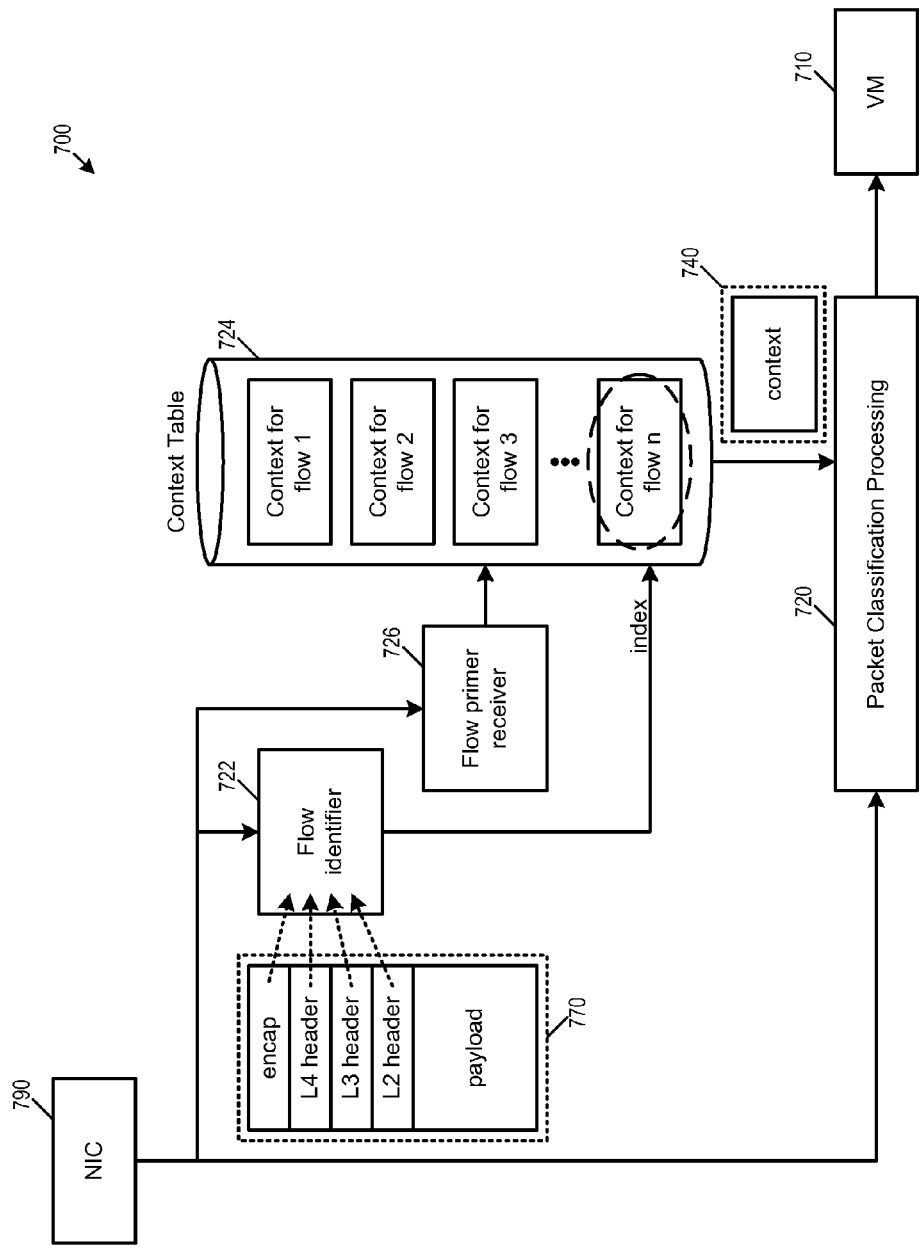
FIG. 7 illustrates a block diagram of a destination transport node that receives a flow primer packet and applies the context delivered by the flow primer packet to packets in the flow.

For some embodiments, FIG. 7 illustrates a block diagram of a destination transport node 700 that receives a flow primer packet and applies the context delivered by the flow primer packet to packets in the flow. The destination transport node 700 receives data packet 770 from network through a NIC 790 and forward the received data packet 770 to a destination 710. As illustrated, the destination transport node 700 includes a packet classification processing module 720, a flow identifier 722, a flow primer receiver 726, and a flow context table 724. In some embodiments, the destination transport node 700 is a computing device that is running virtualization software for hosting one or more VMs such that the destination 710 is a VM, and the packet classification processing module 720, the flow identifier 722, and the primer packet receiver 726 are software modules or operations performed by the virtualization software.

The incoming packet 770 carries payload and headers. The headers include parameters for several layers of networking protocols, including L2 (source and destination MAC addresses), L3 (source and destination IP addresses), and L4 (source and destination port ID). In some embodiments, the packet 570 is a packet encapsulated according to a specific overlay network standard such as VXLAN, STT, or GRE. In some of these embodiments, the packet 770 also carries a VNI for identifying a logical switch for the packet 770 in an encapsulation header. The incoming packet can be a metadata packet for priming a flow (i.e., a flow primer packet) or a regular packet for delivering actual content of the flow or of some other flow or L4 connection session.

The incoming packet 770 arrives at the packet classification process module 720, which performs several classification encoding operations. These classification encoding operations are for a logical pipeline as described above in Section I. The classification encoding operations are based on a flow context 740 that is retrieved from the context table 724, which stores an array of different contexts for different flows.

The incoming packet 770 also arrives at the flow identifier 722. The flow identifier 722 examines the incoming packet 770 for parameters that are used for identifying a flow, e.g., its source and destination MAC addresses (from L2 header), its source and destination IP addresses (from L3 header), its source and destination port ID (from L4 header), and its VNI (from encapsulation header). The flow identifier then produces an index for accessing a context entry in the context table 724 (e.g., by hashing those fields and produce a hash value as index).

The incoming packet 770 also arrives at the flow primer receiver 726, which determines whether the incoming packet 770 is a metadata packet for priming a flow. If the incoming packet 770 is a flow primer, the flow primer receiver 726 stores the flow context information from the primer packet into the context table 724. The storing of the flow context information uses the flow identifying parameters of the packet 770 as index (e.g., by using the index produced by the flow identifier 722).

The context table 724 stores context information (or classification encoding result) for different flows, where the stored context information are stored as entries that are indexed by the flow identifying parameters of the incoming packet. When a packet arrives at the destination transport node 700, the flow identifier 722 provides an index for the context table 724 to provide the corresponding flow context to the packet classification module 720 for processing the packet.

Figure 8:
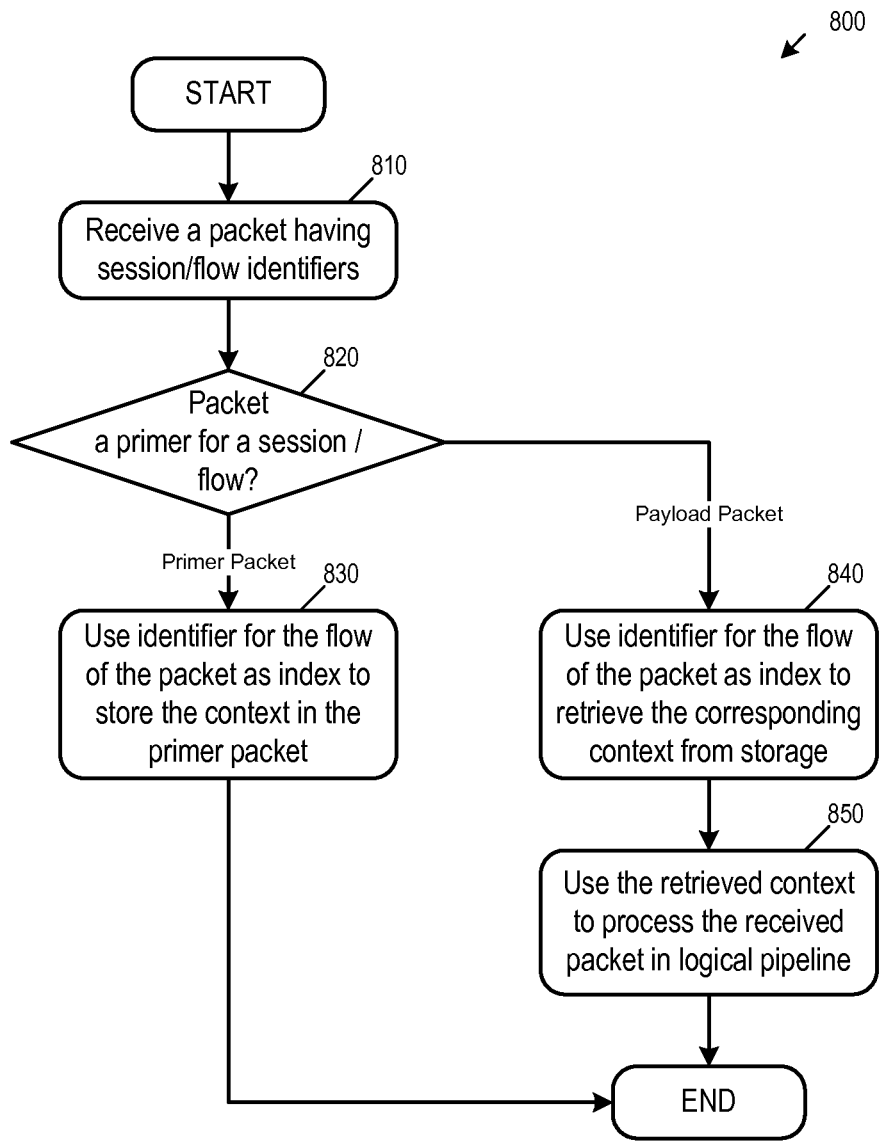
FIG. 8 conceptually illustrates a process for receiving flow context from flow primer packets and for retrieving and applying the received flow contexts for processing packets.

For some embodiments, FIG. 8 conceptually illustrates a process 800 for receiving flow context from flow primer packets and for retrieving and applying the received flow contexts for processing packets. The process 800 is performed by a destination transport node such as the destination node 800. In some embodiments, the destination transport node is a host machine of VMs and its virtualization software performs the process 800. The process 800 will be described by reference to FIG. 7.

The process 800 starts when it receives (at 810) a packet having session or flow identifiers from the network (e.g., through a NIC). In some embodiments, the packet includes L2-L4 headers having parameters that are used as identifiers for flows or L4 connection sessions (e.g., source/destination MAC, source/destination IP, source/destination port, transport protocol.). In some embodiments, the packet also includes a VNI for identifying a logical switch or a logical datapath that is used for identifying a flow.

The process then determines (at 820) whether the received packet is a flow primer packet. In some embodiments, the process identifies a packet bearing flow identifiers for a new flow as a primer packet. In some embodiments, the packet includes flags or other identifiers for indicating that a packet is primer packet. If the received packet is a primer packet for a flow, the process proceeds to 830 to store the content of the flow primer packet. If the received packet is a regular payload packet, the process proceeds to 840 to use a previously stored flow context to process the received packet. By doing so, the flow context received at the start of a particular flow will be applied to all packets belonging to that flow.

At 830, the process uses the flow identifiers in the packet as index to store the flow context in the primer packet in storage. In some embodiments, these flow identifiers are found in the L2-L4 headers of the primer packet. Additional identifier such VNI is found in the encapsulation header of the packet. In the example destination transport node 700, the primer packet receiver 726 extracts the flow context from the primer packet and stores it in the context table 724, while the flow identifier 722 uses the flow identifiers in the headers to generate the index. After storing the flow context information, the process 800 ends.

At 840, the process uses the flow identifiers of the packet as index to retrieve the corresponding context from storage. The process then uses (850) the retrieved flow context to process the received packet in a logical pipeline that classifies the packet based on the packet's flow identifiers. The destination transport node is completing the logical pipeline by using the intermediate classification result passed to it from the source transport node as context. In some embodiments, the logical pipeline is for implementing a logical switching element, which spans multiple managed switching elements in different host machines. The virtualization software being operated by the host machine is operating one of such managed switching elements for performing part of the logical pipeline.

As mentioned, in some embodiments, a context table (such as the context table 724) adds a new entry for a new flow whenever it receives a flow primer packet. Some embodiments do not allow the context table to grow infinitely. For example, some of these embodiments examine the context table for stale entries. If a flow is not active for a configurable period of time (e.g., has not received a packet belonging to that flow for say, a few seconds), its corresponding entry would be identified and purged from the context table as staled garbage entry.

In some embodiments, not all fields of L2-L4 headers of the logical packet need to be specified (wildcarding) when identifying a flow. In some embodiments, the control plane instructs the vswitches (i.e, managed switching elements) on what fields may be wildcarded in a received packet. The use of wildcarding in some embodiments reduces the size of the context table and makes lookups more efficient.

III. Computing Device

Figure 9:
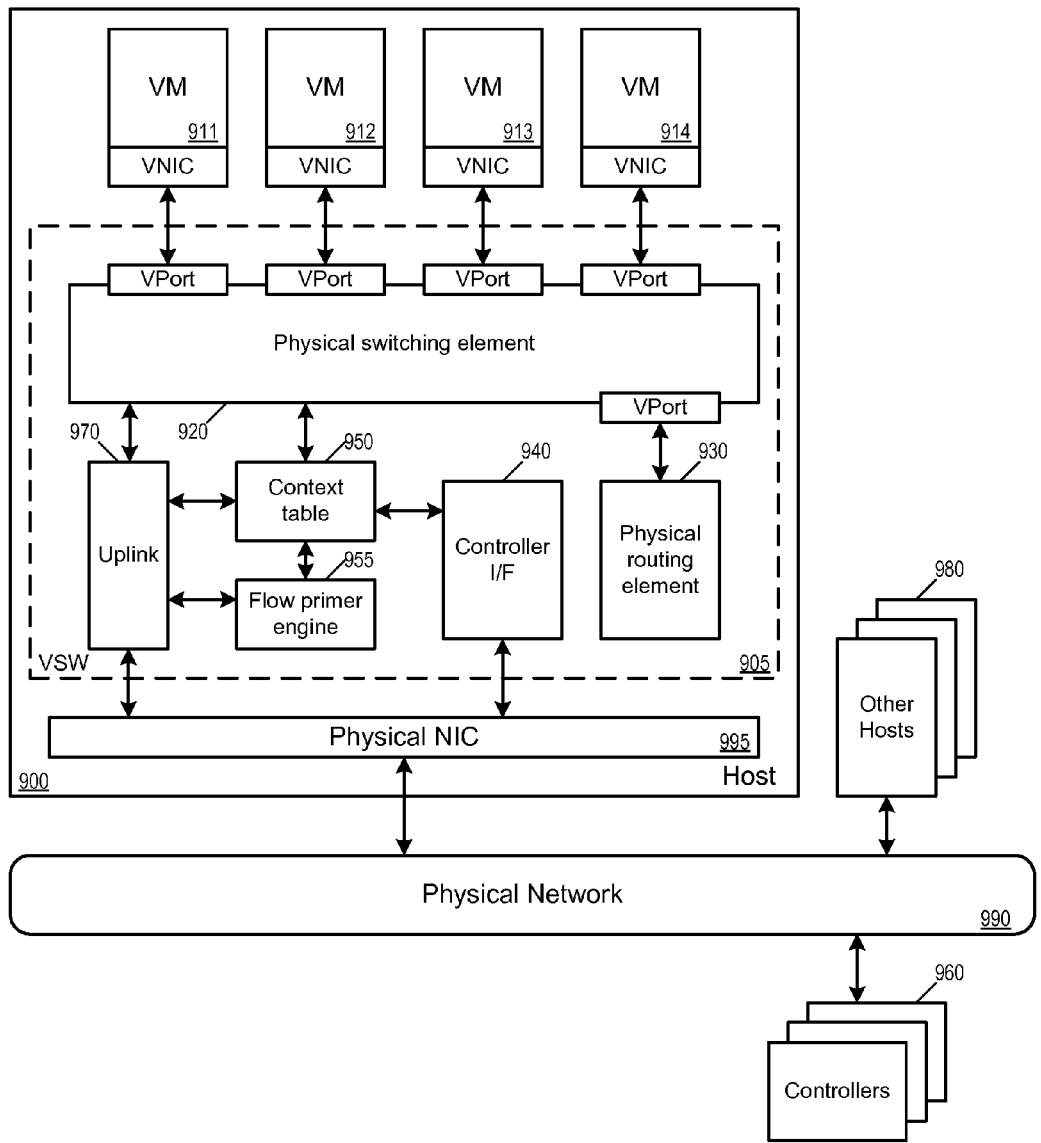
FIG. 9 illustrates an example host machine that is operating virtualization software.

As mentioned earlier, some embodiments of the invention are implemented by virtualization software or hypervisors running on computing devices that server as host machines of VMs. For some embodiments, FIG. 9 illustrates an example host machine 900 that is operating virtualization software 905. The virtualization software 905 allows the host machine to host virtual machines 911-914 as well as connecting the virtual machines to a physical network 990. This physical network 990 may span one or more data centers and include various physical switches and routers.

As illustrated, the host machine 900 has access to the physical network 990 through a physical NIC (PNIC) 995. The virtualization software 905 serves as the interface between the hosted VMs 911-914 and the physical NIC 995 (as well as other physical resources, such as processors and memory). Each of the VMs includes a virtual NIC (VNIC) for accessing the network through the virtualization software 905. Each VNIC in a VM is responsible for exchanging packets between the VM and the virtualization software 905. In some embodiments, the VNICs are software abstractions of physical NICs implemented by virtual NIC emulators.

The virtualization software 905 manages the operations of the VMs 911-914, and includes several components for managing the access of the VMs to the physical network (by implementing the logical networks to which the VMs connect, in some embodiments). As illustrated, the virtualization software 905 includes a physical switching element 920, a managed routing element 930, a controller interface 940, an uplink module 970, a context table 950, and a flow primer engine 955.

The controller interface 940 receives control plane messages from a controller or a cluster of controllers 960. In some embodiments, these control plane message includes configuration data for configuring the various components of the virtualization software and/or the virtual machines (such as the physical switching element 920 and the physical routing element 930). In some embodiments, the control plane disseminates classification encodings (source and destination port contexts) to all vswitches and the associated logical pipeline in the host machines. The controller interface in some of these embodiments receives these classification encodings and store them in the context table 950.

The context table 950 stores entries that corresponds to the classification encoding contexts for various different flows. It maintains and updates flow contexts as packets are being processed by the virtualization software in a logical pipeline. It also stores new flow context received from primer packets. The access of the flow context entries are indexed by the parameters in packet headers. The flow primer engine 955 injects primer packets into uplink module 970 and onto the physical network 990 when it detects that the virtualization software is starting a new flow. The flow primer engine 955 also detects incoming primer packets and extracts classification encoding contexts for new flows for storage.

The physical switching element 920 is a managed switching element that delivers network data to and from the physical NIC 995, which interfaces the physical network 990. The physical switching element also includes a number of virtual ports (vPorts) that communicatively interconnects the physical NIC with the VMs 911-914, the physical routing element 930 and the controller interface 940. Each virtual port is associated with a unique L2 MAC address, in some embodiments. The physical switching element performs L2 link layer packet forwarding between any two network elements that are connected to its virtual ports. The physical switching element also performs L2 link layer packet forwarding between any network element connected to any one of its virtual ports and a reachable L2 network element on the physical network 990 (e.g., another VM running on another host). In some embodiments, the physical switching elements and the vPorts use the flow context provided by the context table 950 to perform the packet classification pipeline.

The physical routing element 930 performs L3 routing (e.g., by performing L3 IP address to L2 MAC address resolution) on data packets received from a virtual port on the physical switching element 920. Each routed data packet is then sent back to the physical switching element 920 to be forwarded to its destination according to the resolved L2 MAC address. This destination can be another VM connected to a virtual port on the physical switching element 920, or a reachable L2 network element on the physical network 990 (e.g., another VM running on another host, a physical non-virtualized machine, etc.).

The uplink module 970 relays data between the physical switching element 920 and the physical NIC 995. In some embodiments, the uplink module 970 allows the host machine 900 to serve as a tunnel endpoint for encapsulation overlay networks such as VXLAN and VLANs. VXLAN is an overlay network encapsulation protocol. An overlay network created by VXLAN encapsulation is sometimes referred to as a VXLAN network, or simply VXLAN. When a VM on the host 900 sends a data packet (e.g., an ethernet frame) to another VM in the same VXLAN network but on a different host, the uplink module 970 encapsulates the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The uplink module 970 also decapsulates incoming VXLAN packets and forwards only the original inner data packet to the destination VM.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

Figure 10:
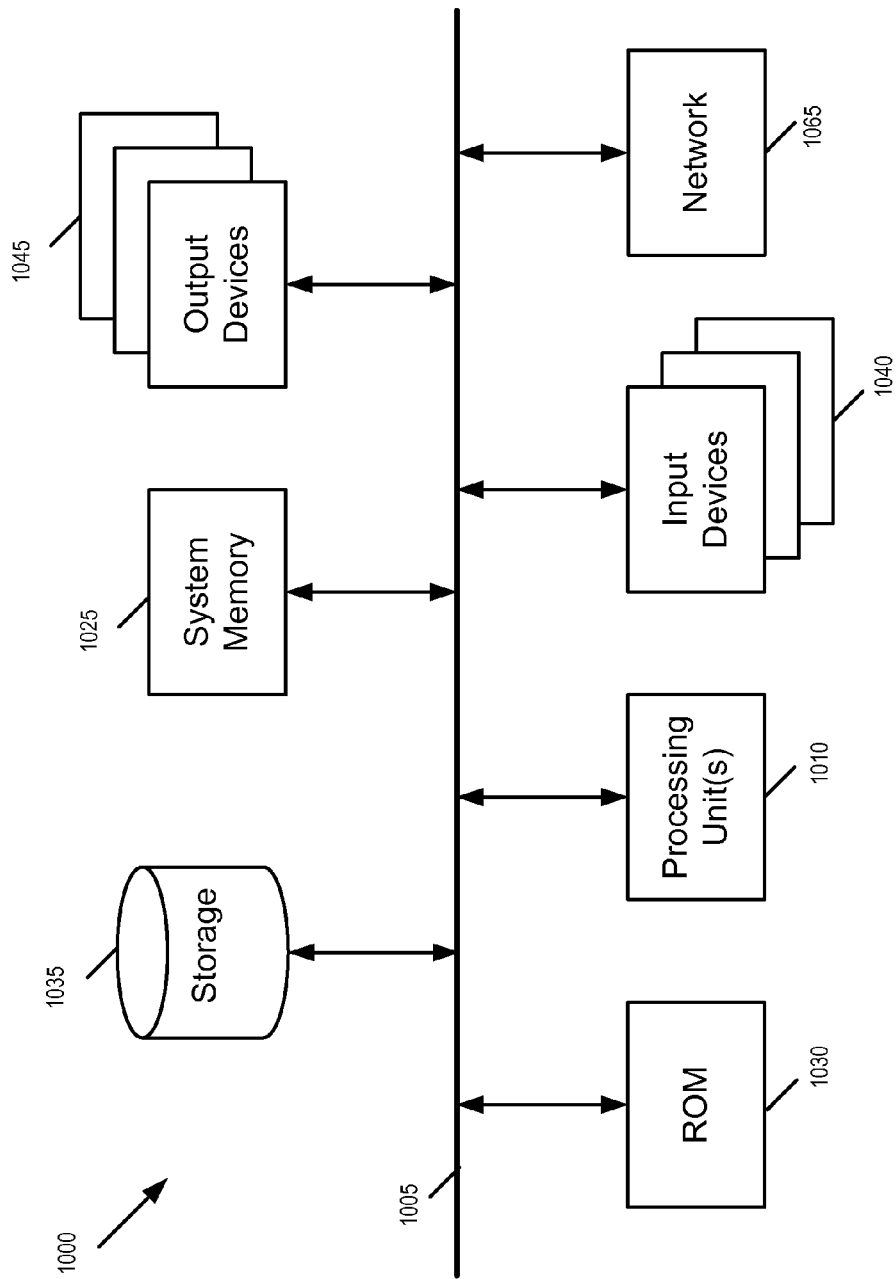
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieves instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. For a forwarding element executed by at least one processing unit of a physical host machine, a method comprising:
   at a first hop forwarding element that receives a packet from a source machine, classifying the packet based on a flow to which the packet belongs;
   storing an intermediate result of the packet classification as a context for the flow, wherein the packet classification is performed by a logical pipeline that spans the first hop forwarding element and a destination forwarding element and the intermediate result is produced by the logical pipeline at the first hop forwarding element;
   generating a metadata packet for carrying the context of the flow;
   transmitting the metadata packet to the destination forwarding element; and
   transmitting the packet to the destination forwarding element after the transmission of the metadata packet.

2. The method of claim 1, wherein the packet is encapsulated according to an overlay network standard.

3. The method of claim 2, wherein a header of the packet does not include a field to carry the context of the flow.

4. The method of claim 1, wherein the flow is identified by parameters in headers of the packet.

5. The method of claim 1, wherein the flow is identified by at least one of a source MAC address, a destination MAC address, a source IP address, a destination IP address, a source port, a destination port, and a transport protocol.

6. The method of claim 5, wherein the flow is further identified by a VXLAN network identifier.

7. The method of claim 1, wherein the logical pipeline implements a logical switching element.

8. For a forwarding element executed by at least one processing unit of a host machine, a method comprising:
   at the forwarding element, receiving a metadata packet from a first hop forwarding element for packets of a particular flow, wherein the metadata packet comprises a set of parameters that identifies the particular flow and carries a context from the first hop forwarding element;
   storing the context of the flow in a table at the forwarding element by using the set of parameters that identifies the flow as an index, the table storing a plurality of contexts for a plurality of different flows;
   receiving a packet belonging to the flow, from the first hop forwarding element and using a set of parameters in the received packet as an index to retrieve the stored context from the table; and
   using the stored context to perform packet classification operation on the received packet.

9. The method of claim 8, wherein the packet classification operation is performed by a logical pipeline that spans the first hop forwarding element and the forwarding element receiving the packet.

10. The method of claim 9, wherein the logical pipeline implements a logical switching element.

11. The method of claim 8, wherein the metadata packet and the packet belonging to the flow are both encapsulated according to an overlay network standard.

12. The method of claim 11, wherein a header of the metadata packet does not include a field to carry the context of the flow.

13. The method of claim 8, wherein the flow is identified by parameters in headers of the metadata packet and of the packet belonging to the flow.

14. The method of claim 8, wherein the flow is identified by at least one of a source MAC address, a destination MAC address, a source IP address, a destination IP address, a source port, a destination port, and a transport protocol.

15. The method of claim 14, wherein the flow is further identified by a VXLAN network identifier.

16. A computing device comprising:
   a set of processing units;
   a non-transitory machine readable medium storing virtualization software that when executed by at least one of the processing units performs a portion of a packet classification operation for a set of packets belonging to a particular flow and generates a context based on the performed portion of the packet classification operation; and
   a physical network interface controller (NIC) that transmits a metadata packet and the set of packets over a physical network to another computing device, wherein the metadata packet comprises the generated context for the other computing device to complete the packet classification operation for the set of data packets belonging to the particular flow.

17. The computing device of claim 16, wherein the virtualization software comprises a managed switching element, wherein the logical pipeline implements a logical switching element that spans multiple managed switching elements in different computing devices.

18. The computing device of claim 16, wherein a header of the metadata packet comprises identifiers for the particular flow.

* * * * *